US006820355B2

(12) United States Patent
Yoshino et al.

(10) Patent No.: US 6,820,355 B2
(45) Date of Patent: Nov. 23, 2004

(54) HYDRAULIC CONTROL CIRCUIT OF BOOM CYLINDER IN WORK MACHINE

(75) Inventors: Tetsuya Yoshino, Tokyo (JP); Yoshiyuki Shimada, Tokyo (JP)

(73) Assignee: Shin Caterpillar Mitsubishi Ltd., Tokyo (JP)

( * ) Notice: Subject to any disclaimer, the term of this patent is extended or adjusted under 35 U.S.C. 154(b) by 66 days.

(21) Appl. No.: 10/276,795

(22) PCT Filed: Dec. 14, 2001

(86) PCT No.: PCT/JP01/11007

§ 371 (c)(1),
(2), (4) Date: Nov. 19, 2002

(87) PCT Pub. No.: WO02/063108

PCT Pub. Date: Aug. 15, 2002

(65) Prior Publication Data

US 2004/0031173 A1 Feb. 19, 2004

(30) Foreign Application Priority Data

Feb. 6, 2001 (JP) ...................................... 2001-029561

(51) Int. Cl.[7] ............................. G05D 1/02; E02F 5/02

(52) U.S. Cl. ............................. 37/348; 37/414; 60/445; 60/452; 91/392; 701/50

(58) Field of Search .............................. 701/50; 37/348, 37/414, 466, 902; 60/443–445, 452; 705/50; 91/392, 418, 419, 446

(56) References Cited

U.S. PATENT DOCUMENTS 5,218,897 A * 6/1993 Shirai et al. .................. 91/436
5,673,558 A * 10/1997 Sugiyama et al. ............ 60/426
6,502,499 B2 * 1/2003 Sannomiya et al. .......... 91/436
6,578,296 B2 * 6/2003 Kimoto et al. ................ 37/443

FOREIGN PATENT DOCUMENTS

| | | | |
|---|---|---|---|
| JP | Y2 6-34443 | | 9/1994 |
| JP | 9-132927 | * | 5/1997 |
| JP | 9-151489 | * | 6/1997 |
| JP | A 11-247236 | | 9/1999 |

* cited by examiner

*Primary Examiner*—Thomas B. Will
*Assistant Examiner*—Thomas A Beach
(74) *Attorney, Agent, or Firm*—Oliff & Berridge, PLC

(57) ABSTRACT

A hydraulic control circuit of a boom cylinder for a work machine, which, when controlling the supply and discharge of pressurized oil with respect to a boom cylinder, improves fuel efficiency, work efficiency in combined operations, and work efficiency and operationality in work of difficult boom operations, such as debris raking-up work and bumping work, etc. The hydraulic control circuit of a boom cylinder is provided with a first change valve for holding the boom control valve in the neutral position, a communication line for causing the head side oil chamber and the rod side oil chamber to communicate with each other, an opening and closing valve for opening and closing the communication line, and a pilot operation check valve that is changed to an unidirectional state where, although an oil flow from the head side oil chamber to the rod side oil chamber is permitted, a reverse flow is hindered, and a bi-directional state is permitted where the oil flows in both directions.

16 Claims, 3 Drawing Sheets

HYDRAULIC CONTROL CIRCUIT OF BOOM CYLINDER IN WORK MACHINE

BACKGROUND OF THE INVENTION

1. Field of the Invention

The invention relates to a hydraulic control circuit for a boom cylinder in construction and/or civil engineering machinery, such as a hydraulic excavator that is used in various types of work machines.

2. Description of Related Art

Generally, in some construction and civil engineering machinery, such as a hydraulic excavator, there is a type in which a front attachment mounted on the machinery body is composed of a boom whose base end portion is supported so as to swing upward and downward, an arm that is supported at the tip end portion of the boom so as to swing forward and backward, and a work attachment, such as a bucket attached to the tip end portion of the arm. In such a piece of machinery, the above-described boom moves upward and downward in line with extension and contraction of a boom cylinder, wherein, conventionally, a hydraulic control circuit, such as shown in FIG. 3, has been known as one of the hydraulic control circuits for the boom cylinder.

That is, in FIG. 3, reference number 8 denotes a boom cylinder, reference numbers 9, 10 denote other hydraulic actuators in addition to an arm cylinder and a bucket cylinder, which are attached to a hydraulic excavator. Reference number 11 denotes a pressurized oil supply source for the boom cylinder 8 and other hydraulic actuators. Reference number 12 denotes an oil reservoir. Reference number 13 denotes a boom control valve for controlling the supply and discharge of pressurized oil with respect to the boom cylinder 8. Reference numbers 14, 15 denote other hydraulic actuator control valves for controlling the supply and discharge of pressurized oil with respect to the other hydraulic actuators. Reference number 16 denotes a pilot valve for outputting pilot pressure to pilot lines C, D at the elevation side and descent side on the basis of the operation of a boom operating lever 17. In addition, reference letter A denotes the head side line for connecting the boom control valve 13 to the head side oil chamber 8*a* of the boom cylinder 8. Reference letter B denotes the rod side line for connecting the boom control valve 13 to the rod side oil chamber 8*b* of the boom cylinder. Also, reference letter G denotes a recycling line for communicating the above-described head side line A to the rod side line B, and a recycling valve 27, provided with a check valve 27*a*, is provided in the recycling line G.

In this type of hydraulic control circuit, when the boom operating lever 17 is operated to the descent side, with the pilot pressure outputted from the pilot valve 16 to the descent side pilot line D, the boom control valve 13 is changed to the descent side position Y. At the same time, the recycling valve 27 is changed to the second position Y that opens the recycling line G, wherein, while pressurized oil from the pressurized oil supply source 11 is supplied to the rod side oil chamber 8*b* of the boom cylinder 8 via the boom control valve 13, oil discharged from the head side oil chamber 8*a* is discharged into the oil reservoir 12, and is further supplied to the rod side oil chamber 8*b* via a recycling valve 27. That is, while the pressure of the head side oil chamber 8*a* is higher than the pressure of the rod side oil chamber 8*b* when the boom is lowered, the oil discharged from the head side oil chamber 8*a* can be provided to the rod side oil chamber 8*b* as recycling oil, whereby the recycling oil is supplied into the rod side oil chamber 8*b* in addition to the pressurized oil of the pressurized oil supply source 11, which is provided from the above-described boom control valve 13. Therefore, the rod side oil chamber 8*b* is not placed into a pressure-reduced state, wherein the operation speed of the boom cylinder 8 can be accelerated. Also, when other hydraulic actuators (for example, arm cylinder and bucket cylinder) for which the pressurized oil supply source of the boom cylinder 8 is concurrently used are operated in combination with a descending operation of the boom, because surplus pump flow volume obtained by the recycling can be provided to the other hydraulic actuators, it is possible to prevent the operation speed of the other hydraulic actuators from being lowered when such a complex operation is carried out, wherein the surplus pump flow volume obtained by the recycling can contribute to an improvement in work efficiency.

However, because a force against the descent of the boom operates where the above-described boom is lowered for execution of rolling work by descent of the boom and scraping work of an inclined plane, it is necessary to supply highly pressurized oil into the rod side oil chamber. To the contrary, when the boom is lowered in the air (where the boom is lowered in a state where the front attachment is not grounded), because a weight applied to the boom (the total weight of the front attachment) operates as a force for contraction of the boom, the pressurized oil supplied into the rod side oil chamber may be low. In addition, as the head side area of a piston of the boom cylinder is larger than the rod side area thereof, only the recycling oil from the above-described head side oil chamber may be sufficient.

Accordingly, where the boom is lowered with the above-described related art hydraulic circuit, not only is recycling oil provided but also pressurized oil from the pressurized oil supply source is provided via the boom control valve even if the boom is lowered in the air. Therefore, there is a problem in that, in cases of operating the arm and bucket while the boom descends in the air, pressurized oil from the pressurized oil supply source is shared among the boom cylinder, arm cylinder and bucket cylinder, wherein the movement of the arm and bucket becomes slow in comparison with independent operations thereof, resulting in a worsening in work efficiency. Further, in spite of only the recycling oil from the head side oil chamber being sufficient where the boom is independently lowered in the air, because pressurized oil is supplied from the pressurized oil supply source to the rod side oil chamber, considerable surplus oil is discharged from the head side oil chamber 8*a* to the oil reservoir 12 via the boom control valve 13, wherein an energy loss is produced, which hinders a decrease in fuel consumption. These and other problems are objects to be solved by the invention.

Further, in a work machine provided with a front attachment consisting of the above-described boom, arm, work attachment, etc., for example, in a case where work for raking up debris is carried out while moving the bucket forward and backward with the bucket bottom grounded, it is necessary that three operations of the boom, arm and bucket so as to cause the bucket bottom to depict a roughly horizontal locus are simultaneously carried out. The operations are delicate, and skilled operations are required. In addition, where the ground is hardened with the bucket bottom by continuously repeated operations of descent and elevation of the boom, that is, bumping work is carried out, unless the boom elevation operation is timely carried out at the instant when the bucket bottom is grounded, the ground is excessively bumped by a reaction caused at the time of descent of the boom, or the front part of a machine body is raised. Therefore, in order to continuously carry out bumping, a highly skilled operation is required. The work requiring such skill is difficult for a beginner, and even a skilled operator is obliged to pay meticulous attention to the work. Accordingly, another problem to be solved exists in that, in such situations, the maneuverability and work efficiency are made worse.

SUMMARY OF THE INVENTION

In view of the above-described situations, the invention was developed to solve these and other problems. It is therefore an object of the invention to provide a hydraulic control circuit for a boom cylinder, which is provided with a boom cylinder extending and contracting so as to move a boom upward and downward and a control valve that is changed, on the basis of operation of an operating member, to an operation position at which pressurized oil is supplied to or discharged from respective oil chambers at the head side and the rod side of the boom cylinder, and to a neutral position at which no pressurized oil is supplied and discharged, and further comprises means for holding the control valve at a neutral position regardless of operation of the operating member, and an oil communicating line for communicating the head side oil chamber and the rod side oil chamber of the boom cylinder with each other, wherein the above-described oil communicating line includes valve means for opening and closing the communicating line, and a direction valve means that is changed to an unidirectional state where a reverse flow is hindered although an oil flow from an oil chamber at the weight-holding side to hold the weight of the boom of the respective oil chambers of the boom cylinder to the other oil chamber is permitted, and a bi-directional state is permitted where oil flows in both directions.

And, with such a structure provided, as in line with work contents carried out by the boom, the control valve can be held in a neutral state and the oil communicating line can be opened and closed in an unidirectional state or a bi-directional state, this contributes to a decrease in fuel consumption, and at the same time, work efficiency can be improved in combination work with other hydraulic actuators for which the pressurized oil supply source of the boom cylinder is concurrently used, or work efficiency and operationality can be improved with respect to work, such as debris raking-up work, or bumping work, for which the boom operations are difficult.

In such a structure, the hydraulic control circuit is provided with discharging means for flowing surplus oil of the oil discharged from the weight-holding side oil chamber of the boom cylinder and supplied into the other oil chamber to an oil reservoir when the control valve is held at the neutral position by the neutral holding means, wherein surplus oil of the oil discharged from the weight-holding side oil chamber flows into the oil reservoir even if the control valve is held at the neutral position, wherein such an inconvenience, by which the discharge of oil from the weight-holding side oil chamber is hindered and the descending speed of the boom is made slow, can be prevented from occurring.

Also, in such a structure, pressure detecting means for detecting pressure in the other oil chamber is provided, and where the pressure of the other oil chamber, which is detected by the corresponding pressure detecting means, is lower than a predetermined pressure, the neutral holding means operates so that the control valve is held in the neutral position, wherein, for example, when the boom is lowered in the air in line with a descending motion of the boom recognized by the pressure of the other oil chamber, the neutral holding means operates to cause the control valve to be held in the neutral position.

Further, the above-described neutral holding means may be composed of, for example, valve means that hinders pilot pressure outputted so that the control valve is operated to the operation position on the basis of operation of an operating member.

Still further, where pressure detecting means for detecting the pressure of the other oil chamber is provided, and the pressure of the other oil chamber, which is detected by the corresponding pressure detecting means, exceeds the predetermined pressure, the direction valve means is set so that a unidirectional state is not changed to a bi-directional state, wherein it is possible to prevent the communicating oil line from being carelessly placed into a bi-directional state, for example, in a case where the front part of the machinery is raised by the boom descending force.

BRIEF DESCRIPTION OF THE DRAWINGS

The invention will be described with reference to the drawings in which.

DETAILED DESCRIPTION OF THE INVENTION

Figure 1:
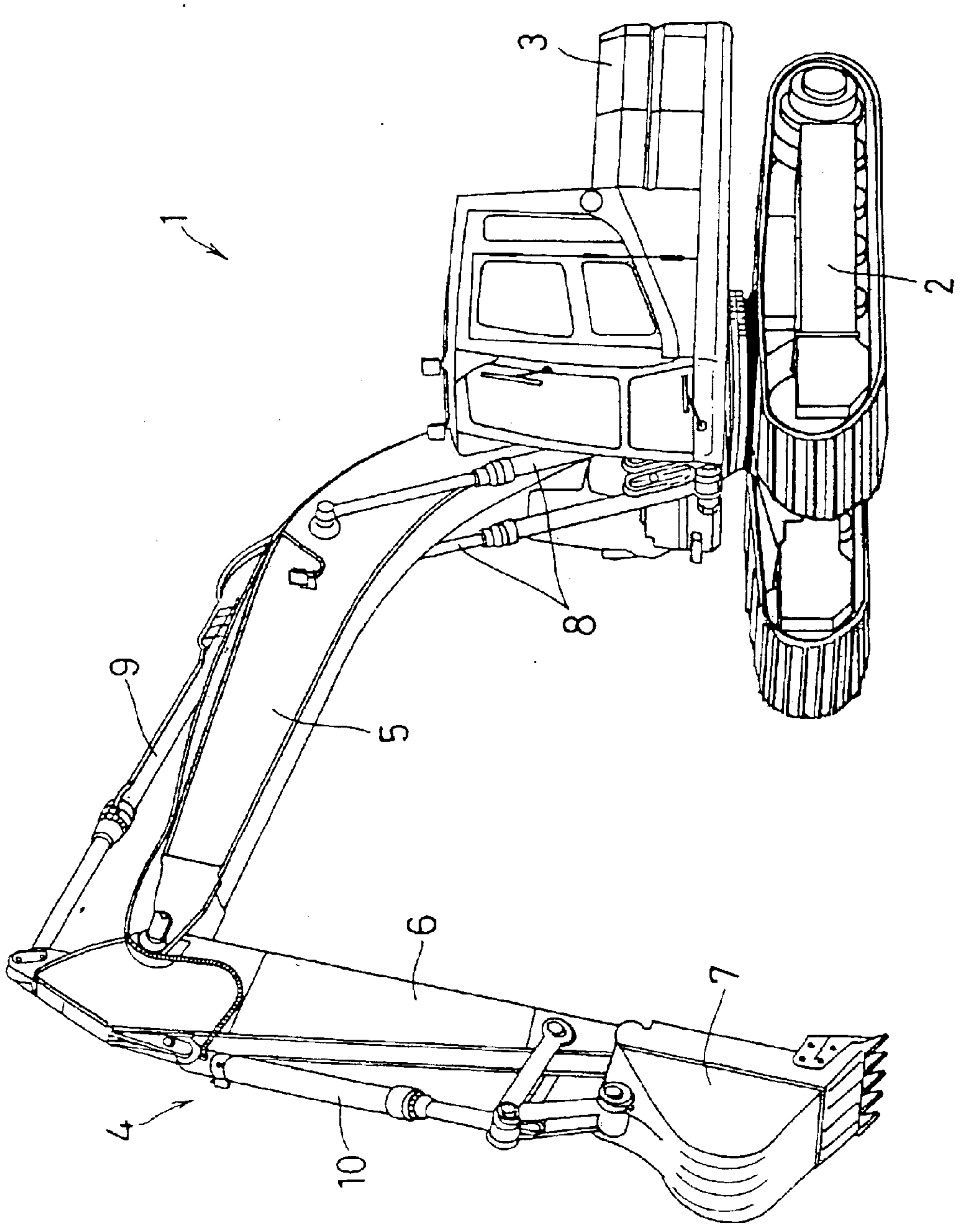
FIG. 1 is a perspective view of a hydraulic shovel.

Next, a description is given of an embodiment of the invention with reference to the accompanying drawings. In the drawings, reference number 1 denotes a hydraulic excavator. The hydraulic excavator 1 is composed of respective parts, such as a crawler type lower structure 2, an upper structure 3 that is rotatably supported on the lower structure 2, and a front attachment 4 attached to the front part of the upper structure 3. Further, the front attachment 4 is composed of a boom 5 that is swingably supported upward and downward on the upper structure 3, an arm 6 that is swingably supported forward and backward at the tip end of the boom 5, a bucket 7 that is swingably supported forward and backward at the tip end of the arm 6, a boom cylinder 8, an arm cylinder 9 and a bucket cylinder 10 that, respectively, swing the boom 5, arm 6 and bucket 7. That is, the basic structure is the same as that of known machinery.

Figure 2:
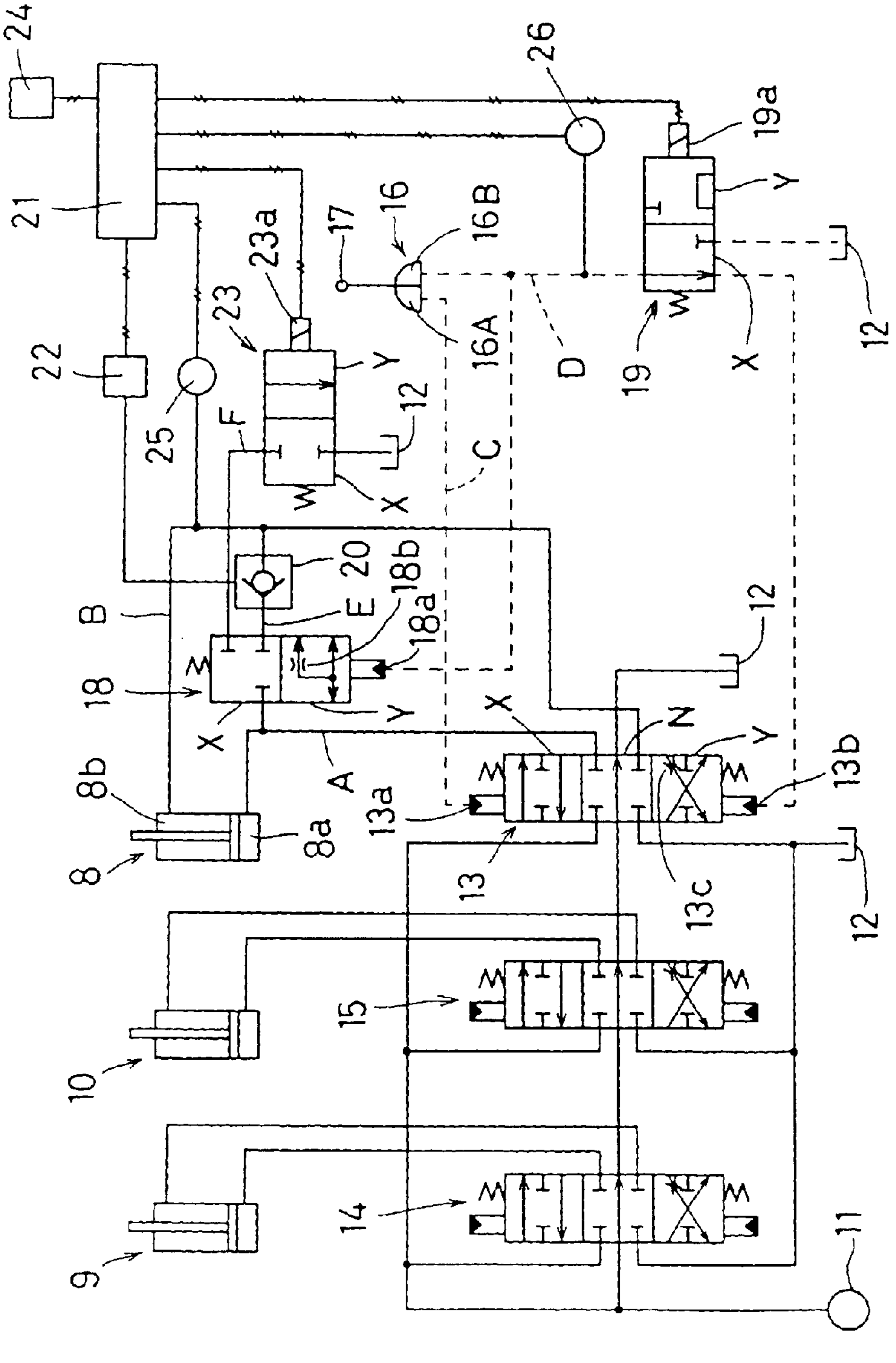
FIG. 2 is a hydraulic circuit diagram showing an embodiment of the invention.
Figure 3:
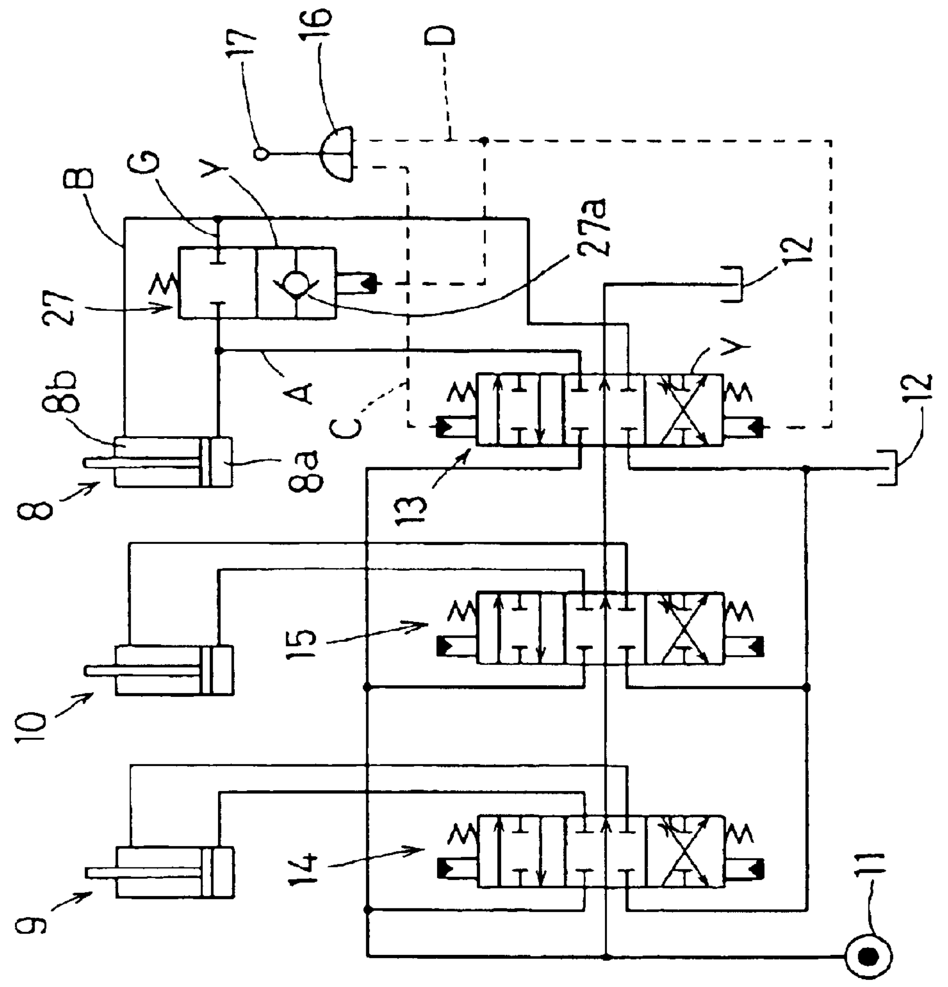
Fig. 3 Related Art
FIG. 3 is a hydraulic circuit diagram showing a related art hydraulic circuit.

FIG. 2 shows a hydraulic control circuit for the above-described boom cylinder 8, wherein reference number 11 denotes a pressurized oil supply source of the boom cylinder 8, reference number 12 denotes an oil reservoir, and reference number 13 denotes a boom control valve that controls the supply and discharge of the pressurized oil with respect to the boom cylinder 8. Reference numbers 14, 15, respectively, denote an arm control valve and a bucket control valve that control the supply and discharge of the pressurized oil with respect to the arm cylinder 9 and the bucket cylinder 10 for which the pressurized oil supply source 11 of the boom cylinder 8 is concurrently used. The control valves 14, 15 are juxtaposed with respect to the above-described boom control valve 13. In addition, in FIG. 2, reference letter A denotes a head side line that communicates the boom control valve 13 with the head side oil chamber 8*a* of the boom cylinder 8. B denotes a rod side line that communicates the boom control valve 13 with the rod side oil chamber 8*b* of the boom cylinder 8.

The above-described boom cylinder 8 is structured so that the boom cylinder 8 is caused to extend by supply of pressurized oil into the head side oil chamber 8*a* and discharge thereof from the rod side oil chamber 8*b*, thereby elevating the boom 5, and is caused to contract by supply of pressurized oil into the rod side oil chamber 8*b* and discharge thereof from the head side oil chamber 8*a*, and the boom 5 thereby descends. In this case, the head side oil chamber 8*a* holds the weight of the front attachment 4, that is, the head side oil chamber 8*a* corresponds to a weight-holding side oil chamber of the invention.

The above-described boom control valve 13 is a three-position change valve of a pilot operating type, which is provided with the elevation side and descending side pilot ports 13*a*, 13*b*. In a state where no pilot pressure is provided in both pilot ports 13*a*, 13*b*, the boom control valve 13 allows pressurized oil from the pressurized oil supply source 11 to flow into the oil reservoir 12, and is positioned in the neutral position N in which no pressurized oil is supplied to and discharged from the boom cylinder 8. However, where pilot pressure is inputted into the elevation side pilot port 13*a*, the boom control valve 13 is changed to the elevation side position X where pressurized oil discharged from the rod side oil chamber 8*b* is caused to flow into the oil tank 12 via the rod side line B while pressurized oil from the pressurized oil supply source 11 is supplied into the head side oil chamber 8*a* of the boom cylinder 8 via the head side line A. And, where pilot pressure is inputted into the descending side pilot port 13*b*, the boom control valve 13 is changed to the descending side position Y where oil discharged from the head side oil chamber 8*a* into the head side line A is caused to flow into the oil reservoir 12 via a restrictor 13*c* while pressurized oil from the pressurized oil supply source 11 is supplied into the rod side oil chamber 8*b* via the rod side line B.

In addition, the arm control valve 14 and bucket control valve 15 have a structure that is similar to that of the above-described boom control valve 13. Therefore, a description of the control valves 14, 15 is omitted.

Further, in FIG. 2 described above, reference number 16 denotes a pilot valve for the boom 5, which is composed of an elevation side pilot valve 16A and a descending side pilot valve 16B. The elevation side pilot valve 16A and descending side pilot valve 16B, respectively, output pilot pressure on the basis of operating a boom operating lever 17 to the elevation side and the descending side. And, the pilot pressure outputted from the elevation side pilot valve 16A is inputted into the elevation side pilot port 13*a* of the boom control valve 13 via the elevation side pilot line C. Also, the pilot pressure outputted from the descending side pilot valve 16B is inputted into a pilot port 18*a* of an opening and closing valve 18 described later via the descending side pilot line D and, at the same time, also supplied into the first change valve 19 described later.

On the other hand, reference letter E denotes a communication line that causes the above-described head side line A and rod side line B to communicate with each other. The above-described opening and closing valve 18 and a pilot operation check valve 20 described later are disposed in the corresponding communication line E.

The above-described opening and closing valve 18 is a two-position and three-port type change valve that is provided with the pilot port 18*a*. The opening and closing valve 18 is located at the first position X in a state where no pilot pressure is inputted into the pilot port 18*a*, and is changed to the second position Y when pilot pressure is inputted into the pilot port 18*a*. And, the opening and closing valve 18 that is located at the first position X closes the above-described communication line E, and at the same time, closes a valve line that permits oil in the head side line A to flow into a discharge oil line F described later. However, the opening and closing valve 18, that is located at the second position Y, opens the communication line E and, at the same time, causes oil in the head side line A to flow into the discharge oil line via a restrictor 18*b*.

In addition, the pilot operation check valve 20 is disposed in the communication line E between the above-described opening and closing valve 18 and the rod side line B. And, when no external signal is inputted, the pilot operation check valve 20 is placed into an unidirectional state where, although the valve 20 permits a flow of oil from the head side line A to the rod side line B, it hinders the flow of oil in the reverse direction, that is, from the rod side line B to the head side line A. However, when an external signal is inputted, the pilot operation check valve 20 is placed into a bi-directional state where it permits flows of oil in both directions.

Herein, in the embodiment, a hydraulic signal is employed as an external signal that is inputted into the above-described pilot operation check valve 20. And, the hydraulic signal is devised to be outputted to the pilot operation check valve 20 via external signal outputting means 22 on the basis of commands from a controller 21 as described below. However, it is needless to say that an electric signal may be used as the external signal.

On the other hand, the above-described first change valve 19 is an electromagnetic two-position and three-port type change valve that is provided with a solenoid 19*a*. In a non-magnetized state of the solenoid 19*a*, the first change valve 19 is located at the first position X where pressure of the descending side pilot line D is supplied to the descending side pilot port 13*b* of the boom control valve 13. However, by magnetization of the solenoid 19*a*, the first change valve 19 is changed to the second position Y where the descending side pilot portion 13*b* is caused to communicate with the reservoir (hydraulic tank) 12.

Further, reference number 23 denotes the second change valve. The second change valve 23 is an electromagnetic type two-position and two-port change valve provided with a solenoid 23*a*. In a non-magnetized state of the solenoid 23*a*, the second change valve 23 is located at the first position X where a discharge oil line F by which oil of the head side line A, which flows from the opening and closing valve 18 located at the above-described second position Y, is closed. However, by magnetization of the solenoid 23*a*, the second change valve 23 is changed to the second position Y where the above-described discharge oil line F is opened.

The first and second change valves 19, 23 are structured so that the solenoids 19*a*, 23*a* are magnetized on the basis of commands from a controller 21.

The above-described controller 21 is structured by using a microcomputer, etc. Signals from an operation switch (a pushbutton switch may be acceptable, which is always turned off, but is turned on only when an operator presses the switch) 24 for which ON and OFF are changed by an operation of an operator, a first pressure sensor 25 for detecting the pressure of the rod side line B, and a second pressure sensor 26 for detecting the pressure of the descending side pilot line D are inputted to the controller 21, and the controller 21 outputs commands to the above-described first and second change valves 19, 23 and the external signal outputting means 22 on the basis of the input signals.

That is, where the pressure P of the rod side line B, which is detected by the first pressure sensor 25 is lower than or equal to a predetermined pressure Pd (P≦Pd), and an output of the pilot pressure from the descending side pilot valve 16B is detected by the second pressure sensor 26, the controller 21 outputs commands, for the magnetization of the solenoids 19*a*, 23*a*, to the first and second change valves 19, 23. On the other hand, where the pressure P of the rod side line B is greater than the above-described predetermined pressure Pd (P>Pd), or where no output of the pilot pressure from the descending side pilot valve 16B is detected, the controller 21 does not output any command, for the magnetization of the solenoids 19*a*, 23*a* to the first and second change valves 19, 23.

Herein, the above-described predetermined pressure Pd is set as the maximum pressure of the rod side line B when the boom 5 falls, when suspended in the air, due to the weight of the front attachment 4. Where the boom 5 falls due to the weight of the front attachment 4, the pressure P of the rod side line B is lower than or equal to the predetermined pressure Pd (P≦Pd). However, where the boom 5 falls down, when suspended in the air, due to any reason other than the weight of the front attachment 4, that is, the boom 5 falls down for surface compaction work or for scraping work of an inclined plane by descent of the boom, or the boom 5 falls down in a state where a force against the descent of the boom 5 operates, the pressure P of the rod-side line B becomes greater than the predetermined pressure Pd (P>Pd).

Also, the controller 21 outputs commands of the external signal output to the external signal outputting means 22 where the operation switch 24 is turned on. On the other hand, where the operation switch 24 is turned off, no command of the external signal output is outputted. Also, in a state where the pressure P of the rod side line B, which is detected by the first pressure sensor 25 is greater than the above-described predetermined pressure Pd (P>Pd), where the operation switch 24 is changed from OFF to ON, the controller 21 is set so that no command of the external signal output is outputted, regardless of an ON signal from the operation switch 24.

In such a structure, as mentioned above, in a state where the boom operation lever 17 is not operated, that is, in a state where no pilot pressure is outputted from the pilot valve 16, no pilot pressure is supplied to the boom control valve 13 and the opening and closing valve 18, and the boom control valve 13 is located at the neutral position N where pressurized oil is not supplied to and is not discharged from the boom cylinder 8. Also, the opening and closing valve 18 is located at the first position X where the communication line E is closed, and at the same time, the valve line from the head side line A to the discharge oil line F is closed. In this state, no pressurized oil is supplied to and discharged from the head side oil chamber 8*a* of the boom cylinder 8 and the rod side oil chamber 8*b* thereof, wherein the boom 5 stops.

On the other hand, where the boom 5 is elevated, as the boom operation lever 17 is operated to the elevation side, the pilot pressure outputted from the elevation side pilot valve 16A is supplied into the elevation side pilot port 13*a* of the boom control valve 13, wherein the boom control valve 13 is changed to the elevation side position X. Thereby, oil discharged from the rod side oil chamber 8*b* is discharged into the oil reservoir 12 via the rod side line B and the boom control valve 13 while the pressurized oil from the pressurized oil supply source 11 is supplied into the head side oil chamber 8*a* of the boom cylinder 8 via the boom control valve 13 and the head side line A. In this regard, the boom cylinder 8 extends to cause the boom 5 to be elevated.

Also, where the boom 5 is lowered, there are various cases, that is, a case where the boom 5 is lowered in the air (the boom 5 is lowered with the front attachment 4 not grounded), a case where the boom 5 is lowered in a state where a force against the descent of the boom for surface compaction work and scraping work of an inclined plane operates by descent of the boom, and a case where debris raking-up work or bumping work is carried out with the bottom of the bucket 7 grounded, wherein it is possible to carry out a descending operation of the boom 5 suited to respective work on the basis of the ON/OFF change of the above-described operation switch 24 and pressure detection of the rod side line B, etc.

That is, when the boom is lowered in the air, or when the boom 5 is lowered in a state where a force against the descent of the boom due to surface compaction work or scraping work of an inclined plane by descent of the boom is applied, the operation switch 24 is turned off. With the operation switch 24 turned off, the controller 21 does not output commands of the external signal output to the external signal outputting means 22, whereby the pilot operation check valve 20 is placed into an unidirectional state where, although the pilot operation check valve 20 permits a flow of oil from the head side line A to the rod side line B, the valve 20 hinders a reverse flow, that is, prevents oil from flowing from the rod side line B to the head side line A.

In this state, where the boom operating lever 17 is operated to the descending side to cause the boom 5 to move down in the air, the output of the pilot pressure from the descending side pilot valve 16B is detected by the second pressure sensor 26, and at the same time because the pressure P of the rod side line B, which is detected by the first pressure sensor 25, becomes lower than or equal to the predetermined pressure Pd (that is, P≦Pd), commands for magnetization of the solenoids 19*a* and 23*a* are outputted from the controller 21, wherein both the first and second change valves 19, 23 are changed to the second position Y.

And, in a state where the above-described first change valve 19 is located at the second position Y, even if pilot pressure is outputted from the descending side pilot valve 16B on the basis of operation of the boom operating lever 17, the pilot pressure is not supplied to the descending side pilot port 13*b* of the boom control valve 13, and the boom control valve 13 is held at the neutral position N, whereby no pressurized oil is supplied to and discharged from the boom cylinder 8 of the boom control valve 13.

On the other hand, the pilot pressure that is outputted from the descending side pilot valve 16B on the basis of operation of the boom operating lever 17 is provided to the pilot port 18*a* of the opening and closing valve 18, and causes the opening and closing valve 18 to be changed to the second position Y where the communication line E is opened. Further, as described above, the second change valve 23 is located at the second position Y, where the oil discharge line F is opened, by commands from the controller 21, and the pilot operation check valve 20 is placed into a unidirectional state.

Accordingly, oil discharged from the head side oil chamber 8*a* of the boom cylinder 8 is supplied to the rod side oil chamber 8*b*, as recycling oil, via the head side line A, communication line E and rod side line B, and at the same time, is discharged into the oil reservoir 12 via the oil discharge line F, whereby the boom cylinder 8 is caused to contract, and the boom 5 is lowered. In this case, because the boom 5 is lowered due to the weight of the front attachment 4, pressurized oil may be provided into the rod side oil chamber 8*b* to the extent that the rod side oil chamber 8*b* does not become a vacuum, wherein only the recycling oil from the head side oil chamber 8*a* is sufficient. And, surplus oil left by subtracting the volume of oil supplied into the rod side oil chamber 8*b* from the oil discharged from the head side oil chamber 8*a* will be discharged into the oil reservoir 12 via the oil discharge line F.

To the contrary, where the boom 5 is lowered in a state where a force against the descent of the boom to carry out surface compaction work and scraping work of an inclined plane by descent of the boom operates, because the pressure P at the rod side line B becomes greater than the predetermined pressure Pd (that is, P>Pd), no command for magnetization of the solenoids 19*a*, 23*a* is outputted from the controller 21, so that the first and second change valves 19, 23 are located at the first position X.

And, in a state where the first change valve 19 is located at the first position X, the pilot pressure outputted from the descending side pilot valve 16B on the basis of operation of the boom operating lever 17 is supplied into the descending side pilot port 13*b* of the boom control valve 13 via the first change valve 19 at the above-described first position X, wherein the boom control valve 13 is changed to the descending side position Y.

Further, the pilot pressure outputted from the descending side pilot valve 16B on the basis of operation of the boom operating lever 17 is supplied into the pilot port 18*a* of the opening and closing valve 18, wherein the opening and closing valve 18 is changed to the second position Y where the communication line E is opened. Also, the second change valve 23 is located at the first position X, where the oil discharge line F is closed, by commands from the controller 21 as described above, and the pilot operation check valve 20 is placed into an unidirectional state.

Accordingly, while pressurized oil from the pressurized oil supply source 11 is supplied into the rod side oil chamber 8*b* of the boom cylinder 8 via the boom control valve 13 of the above-described descending side position Y and the rod side line B, oil discharged from the head side oil chamber 8*a* is supplied into the rod side oil chamber 8*b*, as recycling oil, via the head side line A, the communication line E and the rod side line B. At the same time, surplus oil remaining after subtracting the volume of oil, which is supplied into the rod side oil chamber 8*b*, the oil discharged from the head side oil chamber 8*a* is discharged into the reservoir 12 via the boom control valve 13 of the above-described descending side position Y, wherein the boom cylinder 8 is caused to contract, and the boom 5 is lowered.

On the other hand, where debris raking-up work and bumping work are carried out with the bottom of the bucket 7 grounded, the operation switch 24 is turned on. With the operation switch 24 turned on, commands of an external signal output are outputted from the controller 21 to the external signal outputting means 22, whereby the pilot operation check valve 20 is placed into a bi-directional state where oil flows in both directions, that is, from the head side line A to the rod side line B and from the rod side line B to the head side line A, is permitted.

As described above, when the pressure P of the rod side line B, which is detected from the first pressure sensor 25, is greater than the predetermined pressure Pd (that is, P>Pd), commands of the external signal output are not outputted. That is, the pilot operation check valve 20 may be placed into a bi-directional state only where the pressure P of the rod side line B is lower than or equal to the predetermined pressure Pd (that is, P≦Pd).

In this state, as the boom operating lever 17 is operated to the descending side, the output of the pilot pressure from the descending side pilot valve 16B is detected by the second pressure sensor 26, and at the same time, because the pressure P of the rod side line B, which is detected by the first pressure sensor 25, is lower than or equal to the set pressure Pd (that is, P≦Pd), commands for magnetization of the solenoids 19*a*, 23*a* are outputted from the controller 21, wherein the first and second change valves 19, 23 are changed to the second position Y. And, in a state where the first change valve 19 is located at the second position Y, supply of the pilot pressure to the descending side pilot port 13*b* is interrupted, and the boom control valve 13 is held at the neutral position N, whereby no pressurized oil is supplied to and discharged from the boom cylinder 8 through the boom control valve 13.

On the other hand, as pilot pressure outputted from the descending side pilot valve 16B is provided into the pilot port 18*a*, the opening and closing valve 18 is changed to the second position Y where the communication line E is opened. Further, as described above, the second change valve 23 is located at the second position Y, where the oil discharge line F is opened, by commands from the controller 21, and the pilot operation check valve 20 is placed into a bi-directional state.

Therefore, the head side oil chamber 8*a* and rod side oil chamber 8*b* of the boom cylinder 8 are caused to communicate with each other via the communication line E, wherein oil can freely flow between both oil chambers 8*a*, 8*b*. At the same time, a part of the oil discharged from both oil chambers 8*a*, 8*b* is caused to flow into the oil reservoir 12 via the oil discharge line F. And, in this state, the boom cylinder 8 automatically extends and contracts in response to an external force in the contraction direction. Therefore, the boom 5 is lowered due to the weight of the front attachment 4 until the descent of the bucket 7 is hindered due to the bucket 7 being brought into contact with the ground, and is elevated when an upward external force, such as a reaction force from the ground, operates.

As described above, in the present embodiment, where the boom 5 is lowered in the air, the boom control valve 13 is held in the neutral position N, wherein no pressurized oil from the pressurized oil supply source 11 is supplied to the boom cylinder 8, but only recycling oil from the head side oil chamber 8*a* is supplied into the rod side oil chamber 8*b* of the boom cylinder 8. As a result, where the arm 6 and bucket 7 are operated while the boom 5 descends in the air, all the oil from the pressurized oil supply source 11 will be supplied into the arm cylinder 9 and bucket cylinder 10, wherein movements of the arm 6 and the bucket 7 are made fast, and work efficiency is improved. In addition, where the boom 5 is independently lowered in the air, it is possible to eliminate a loss of energy, by which unnecessary pressurized oil is supplied from the pressurized oil supply source 11 to the boom cylinder 8. Therefore, the present embodiment can contribute to a lowering of fuel consumption. In this case, in such a type in which a variable control pump is employed, which is controlled so that the pump flow amount is minimized when the control valve is located in the neutral position, further lowering of fuel consumption can be achieved.

To the contrary, where the boom is lowered in order to carry out surface compaction work and scraping work of an inclined plane by descent of the boom, the boom control valve 13 is changed to the descending side position Y, whereby recycling oil from the head side oil chamber 8*a* and pressurized oil from the pressurized oil supply source 11 are supplied into the rod side oil chamber 8*b* of the boom cylinder 8 while the pressure of the rod side oil chamber 8*b* is lower than the pressure of the head side oil chamber 8*a*, and after the pressure of the rod side oil chamber 8*b* becomes higher than the pressure of the head side oil chamber 8*a*, supply of the recycling oil is blocked by the pilot operation check valve 20, and only the pressurized oil from the pressurized oil supply source 11 is supplied, wherein it becomes possible to carry out descending work of the boom 5 in a state where a force resisting the descent operates.

Further, where debris raking-up work and bumping work are carried out with the bottom of the bucket 7 grounded, the operation switch 24 is turned on and is operated to the descending side of the boom. Then, the boom control valve 13 is held in the neutral position N, and at the same time, the head side oil chamber 8*a* and the rod side oil chamber 8*b* of the boom cylinder 8 are caused to communicate with each other via the communication line E. And, for example, where debris raking-up work is carried out, if an arm drawing operation (that is, extending of the arm cylinder 9) and a bucket opening operation (that is, contraction of the bucket cylinder 10) are carried out in a state where the boom operating lever 17 is set to the descending side (the amount of operation may be adequate), the boom 5 will be automatically elevated by a reaction force from the ground while the boom 5 is automatically lowered due to the weight of the front attachment 4, wherein it is possible to move the bucket 7 along the ground surface without any minute operations of the boom 5. Accordingly, work efficiency and maneuverability can be improved. Also, where bumping work is carried out, if the boom operating lever 17 is operated to the descending side, the boom 5 is lowered due to the weight of the front attachment 4 until the bucket 7 is grounded, and stops descending if the bucket 7 is grounded and its movement is hindered. Therefore, it is possible to remove an inconvenience, such as raising of the machinery body due to a reaction force, when the boom descends, due to losing of the boom raising timing, wherein work efficiency and maneuverability can be improved.

Herein, as described above, where the pressure P of the rod side line B, which is detected by the first pressure sensor 25, is greater than the predetermined pressure Pd (that is, P>Pd), the pilot operation check valve 20 is set so as not to be placed into a bi-directional state even if the operation switch 24 is turned on. Thereby, for example, when an operator erroneously turns on the operation switch 24 and operates to lower the boom 5, intending to raise the machinery body, in a state where the front side of the machinery body is raised by grounding the bucket 7 by descent of the boom 5 (in this state, the pressure in the rod side line B is greater than the set pressure Pd (P>Pd)), it is possible to prevent the front side of the machinery body from falling to the ground due to extension of the boom cylinder 8 because oil in the rod side line B flows into the head side line A via the pilot operation check valve 20 in a bi-directional state.

In summary, a hydraulic control circuit for a boom cylinder according to the invention is provided with a control valve that can be changed to an operation position where pressurized oil is supplied to and discharged from the boom cylinder on the basis of operations of an operating member, and a neutral position where no pressurized oil is supplied or discharged, and further includes neutral holding means by which the control valve is held at the neutral position regardless of operations of the operating member, and a communication line where oil chambers of the boom cylinder can be caused to communicate with each other, wherein the corresponding communication line is provided with opening and closing valve means that open and close the communication line and direction valve means that is changed to an unidirectional state where a reverse flow of oil is hindered although an oil flow from the weight holding side oil chamber of the boom cylinder to the other oil chamber is permitted, and a bi-directional state is permitted where a flow of oil is in both directions. As a result, if the control valve is set in the neutral position, and the communication line is opened and closed in an unidirectional state or a bi-directional state, a lowering of fuel consumption, work efficiency in combinations of operations, or work efficiency and maneuverability in accomplishing difficult boom operations, such as debris raking-up work or ground tamping work, can be improved.

The invention is not limited to the above-described embodiment. Not only are the arm cylinder and bucket cylinder acceptable but also a hydraulic actuator, such as a travelling motor, swivel motor, etc., may be acceptable as the hydraulic actuator whose pressurized oil supply source is concurrently used for the boom cylinder. In cases of such hydraulic actuators, an operation speed interlocked with the descent of the boom in the air can be made fast. In addition, a connection between a control valve for these hydraulic actuators and a control valve for boom control may be in series or in parallel. In either case, similar effects can be achieved.

What is claimed is:

1. A hydraulic control circuit of a boom cylinder for a work machine, which is provided with a boom cylinder extending and contracting to move a boom upward and downward, and a control valve that is changed to an operation position where pressurized oil is supplied to and discharged from respective oil chambers at the head side and rod side of the boom cylinder on the basis of operations of an operating member, and to a neutral position where no pressurized oil is supplied thereto and discharged therefrom, the hydraulic control circuit comprising:

neutral holding means by which the control valve is held in the neutral position regardless of a descent operation of the operating member; and a communication line by which the head side oil chamber and rod side oil chamber of the boom cylinder are caused to communicate with each other, the communication line is provided with opening and closing valve means that open and close the communication line, and direction valve means that is changed to an unidirectional state in which, although an oil flow from a weight holding side oil chamber, for holding the weight of the boom, to the other oil chamber of the respective oil chambers of the boom cylinder is permitted, a reverse oil flow is hindered, and a bi-directional state in which oil flows in both directions between the respective oil chambers are permitted.

2. The hydraulic control circuit of a boom cylinder for a work machine according to claim 1, wherein the hydraulic control circuit further includes discharge means for flowing surplus oil, which is discharged from the weight-holding side oil chamber of the boom cylinder and supplied into the other oil chamber when the control valve is held in the neutral position by the neutral holding means, into an oil reservoir.

3. The hydraulic control circuit of a boom cylinder for a work machine according to claim 1, further comprising a pressure detector that detects the pressure of the other oil chamber, and when the pressure, of the other oil chamber which is detected by said pressure detector, is lower than or equal to a predetermined pressure, the neutral holding means operates so that the control valve is held in the neutral position.

4. The hydraulic control circuit of a boom cylinder for a work machine according to claim 1, wherein the neutral holding means comprises valve means that can interrupt a pilot pressure outputted so as to change the control valve to the operation position on the basis of operations of the operating member.

5. The hydraulic control circuit of a boom cylinder for a work machine according to claim 1, further comprising a pressure detector that detects the pressure of the other oil chamber, and when the pressure, of the other oil chamber which is detected by said pressure detector, exceeds a predetermined pressure, the direction valve means is set so as not to change from the unidirectional state to the bi-directional state.

6. The hydraulic control circuit of a boom cylinder for a work machine according to claim 2, further comprising a pressure detector that detects the pressure of the other oil chamber, and when the pressure, of the other oil chamber which is detected by said pressure detector, is lower than or equal to a predetermined pressure, the neutral holding means operates so that the control valve is held in the neutral position.

7. The hydraulic control circuit of a boom cylinder for a work machine according to claim 2, wherein the neutral holding means comprises valve means that can interrupt a pilot pressure outputted so as to change the control valve to the operation position on the basis of operations of the operating member.

8. The hydraulic control circuit of a boom cylinder for a work machine according to claim 3, wherein the neutral holding means comprises valve means that can interrupt a pilot pressure outputted so as to change the control valve to the operation position on the basis of operations of the operating member.

9. The hydraulic control circuit of a boom cylinder for a work machine according to claim 6, wherein the neutral holding means comprises valve means that can interrupt a pilot pressure outputted so as to change the control valve to the operation position on the basis of operations of the operating member.

10. The hydraulic control circuit of a boom cylinder for a work machine according to claim 2, further comprising a pressure detector that detects the pressure of the other oil chamber, and when the pressure, of the other oil chamber which is detected by said pressure detector, exceeds a predetermined pressure, the direction valve means is set so as not to change from the unidirectional state to the bi-directional state.

11. The hydraulic control circuit of a boom cylinder for a work machine according to claim 3, wherein when the pressure detector detects the pressure of the other oil chamber exceeds the predetermined pressure, the direction value means is set so as not to change from the unidirection state to the bi-directional state.

12. The hydraulic control circuit of a boom cylinder for a work machine according to claim 6, wherein when the pressure detector detects the pressure of the other oil chamber exceeds the predetermined pressure, the direction value means is set so as not to change from the unidirection state to the bi-directional state.

13. The hydraulic control circuit of a boom cylinder for a work machine according to claim 4, further comprising a pressure detector that detects the pressure of the other oil chamber, and when the pressure, of the other oil chamber which is detected by said pressure detector, exceeds a predetermined pressure, the direction valve means is set so as not to change from the unidirectional state to the bi-directional state.

14. The hydraulic control circuit of a boom cylinder for a work machine according to claim 7, further comprising a pressure detector that detects the pressure of the other oil chamber, and when the pressure, of the other oil chamber which is detected by said pressure detector, exceeds a predetermined pressure, the direction valve means is set so as not to change from the unidirectional state to the bi-directional state.

15. The hydraulic control circuit of a boom cylinder for a work machine according to claim 8, wherein when the pressure detector detects the pressure of the other oil chamber exceeds the predetermined pressure, the direction value means is set so as not to change from the unidirection state to the bi-directional state.

16. The hydraulic control circuit of a boom cylinder for a work machine according to claim 9, wherein when the pressure detector detects the pressure of the other oil chamber exceeds the predetermined pressure, the direction value means is set so as not to change from the unidirection state to the bi-directional state.

* * * * *